Apr. 10, 1923.
E. J. HYLAND
CURTAIN MOUNTING FOR TRUCKS
Filed Nov. 19, 1921
1,451,660
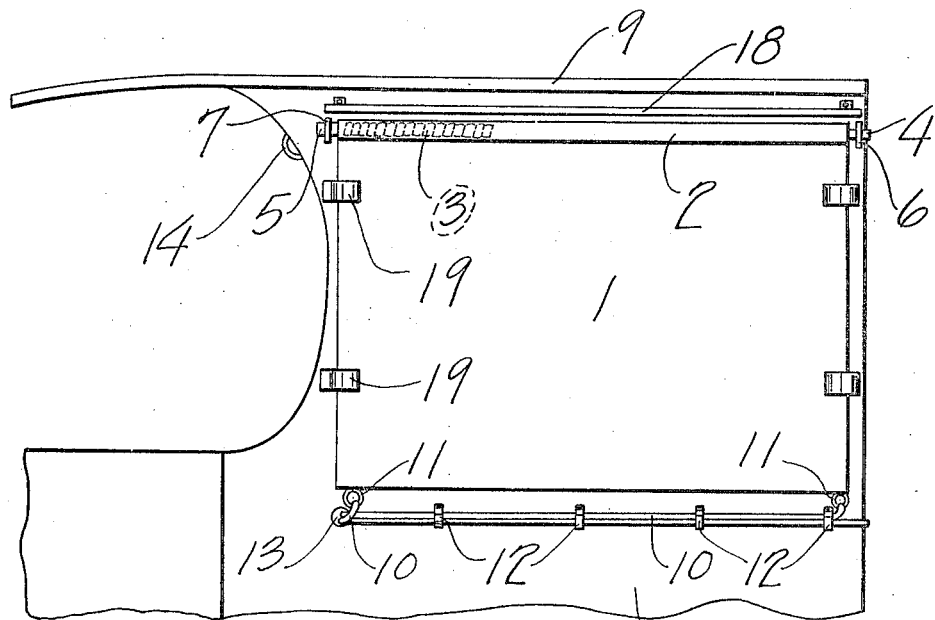
Fig. 1.
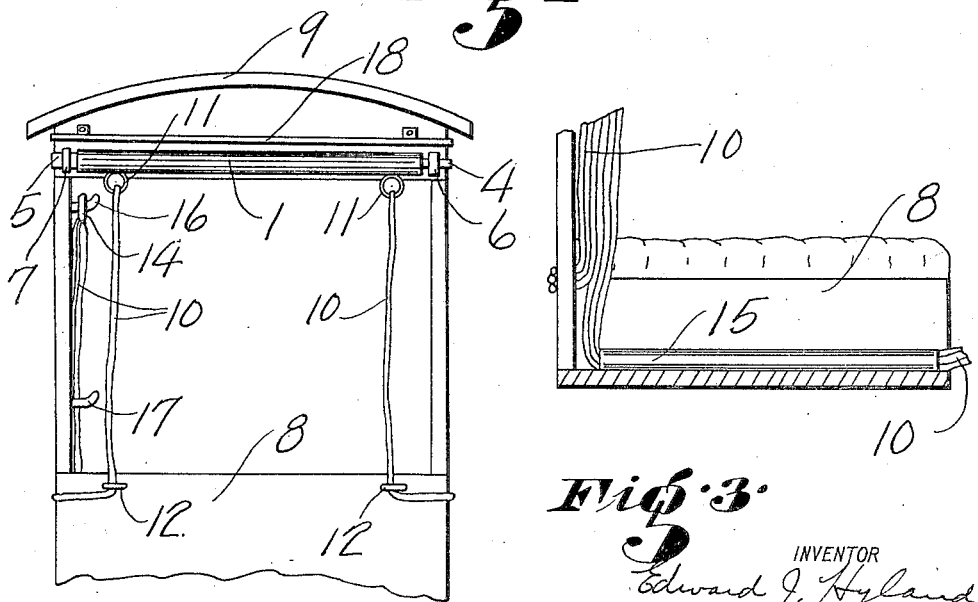
Fig. 2.
Fig. 3.
INVENTOR
Edward J. Hyland
BY
Adam E. Fisher
ATTORNEY Patented Apr. 10, 1923.

1,451,660

UNITED STATES PATENT OFFICE.

EDWARD J. HYLAND, OF MOUNT MORRIS, ILLINOIS.

CURTAIN MOUNTING FOR TRUCKS.

Application filed November 19, 1921. Serial No. 516,454.

*To all whom it may concern:*

Be it known that I, EDWARD J. HYLAND, a citizen of the United States, residing in the city of Mount Morris and State of Illinois, have invented new and useful Improvements in Curtain Mountings for Trucks, of which the following is a specification, reference being had to the accompanying drawings.

This invention is a system of curtain mountings for cage motor trucks and like vehicles, and the object is to provide a set of curtains or shades attachable to any standard truck, and which may be raised or lowered readily by the driver while in his seat.

In the drawings:

Figure 1 is a side elevation of a section of a truck showing one of the side curtains mounted in place in accordance with my invention, the curtain being lowered.

Figure 2 is a rear elevation of a truck, showing the back curtain mounted after my improvement, the curtain being raised.

Figure 3 is a detail showing the arrangement of the curtain cables inside the truck.

In carrying out this invention, the curtains or shades are mounted upon rollers 2, controlled by coil springs 3 set in the ends of the rollers after the manner of the ordinary shade roller, and these rollers have studs 4 and 5 at their ends, whereby they are suspended from brackets 6 and 7 mounted on the truck 8 at or near the top or roof 9. These brackets are also like the ordinary shade roller brackets, the bracket 6 having a hole to engage the round stud 4, and the bracket 7 having a slot to engage the flat stud 5. By this arrangement, the spring 3 being wound up, the curtains 1 will normally be wound or rolled up on the rollers 2, but may be pulled down against the action of the spring. Two flexible wires or cables 10 are attached at the points 11 to either side of each of the curtains, and are run through screw-eyes 12 secured outwardly on the body of the truck, and vertically beneath the points 11, and are then run in through the apertures 13, at each side of the vehicle. The object is to center all the wires to the ring 14 at one side of the truck, and for this purpose the wires from the opposite side are extended across the floor of the truck through screw eyes, or preferably through a tube 15, and all the wires are then attached to the said ring 14. Upper and lower hooks 16 and 17 are mounted on the truck frame at the hand of the driver. By drawing on the ring 14, and placing it over the upper hook 16 all the curtains are at once drawn down and so fastened. By releasing the ring 14 from the hook 16, the action of the springs 3 will automatically raise all the curtains, and the ring 14 may be then placed on the lower hook 17. Hoods 18 may be mounted above the rollers 2 to protect them from the rain and weather, and fingers 19 may be extended to hold the front edges of the curtains down and prevent flapping.

While I have herein described a certain specific method of constructing and assembling the elements of my invention it is understood that same may be varied in minor details, not departing from the spirit of the invention as defined in the appended claim.

I claim:

Curtain mountings for cage trucks, comprising spring-controlled roller shades at the outer sides and back of the truck and adapted to draw down outside; guide fingers outwardly on the frame of the truck and extended loosely over the vertical edges of the shades; screw-eyes mounted outwardly of the truck along the lower horizontal edges thereof; a tube across the floor inside the front of the truck; a hook at one side inside the top of the truck at the hand of the driver; an opening through each side of the truck at the front end thereof; and cables attached to the lower edges of the shades, and extended through the said screw-eyes, forwardly around the outer sides of the truck and through the said openings at the front, the cable ends at the side under the said hook being extended straight up thereto and the cable ends from the opposite side being extended through the said tube and thence up to the said hook; and a ring secured to all of the said cable ends for releasably attaching to the said hook.

EDWARD J. HYLAND.

Witnesses:
J. L. RICE,
D. L. MILLER.